(12) United States Patent
Kurachi et al.

(10) Patent No.: US 9,204,516 B2
(45) Date of Patent: Dec. 1, 2015

(54) LIGHT-EMITTING DIODE DRIVER CIRCUIT AND LED LIGHT SOURCE

(75) Inventors: Toshiaki Kurachi, Kyoto (JP); Kazuo Gouda, Kagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 283 days.

(21) Appl. No.: 13/996,327

(22) PCT Filed: Dec. 27, 2011

(86) PCT No.: PCT/JP2011/007306
§ 371 (c)(1),
(2), (4) Date: Jun. 20, 2013

(87) PCT Pub. No.: WO2012/090489
PCT Pub. Date: Jul. 5, 2012

(65) Prior Publication Data
US 2013/0271001 A1 Oct. 17, 2013

(30) Foreign Application Priority Data

Dec. 27, 2010 (JP) ................................. 2010-291328

(51) Int. Cl.
| | | |
|---|---|---|
| *H01J 13/46* | (2006.01) | |
| *H05B 33/08* | (2006.01) | |
| *F21V 17/10* | (2006.01) | |
| *F21K 99/00* | (2010.01) | |
| *F21Y 101/02* | (2006.01) | |
| *F21V 3/04* | (2006.01) | |

(52) U.S. Cl.
CPC ............ *H05B 33/0878* (2013.01); *F21V 17/10* (2013.01); *H05B 33/0815* (2013.01); *H05B 33/0824* (2013.01); *F21K 9/1375* (2013.01); *F21V 3/0409* (2013.01); *F21V 3/0418* (2013.01); *F21V 3/0436* (2013.01); *F21Y 2101/02* (2013.01)

(58) Field of Classification Search
None
See application file for complete search history.

(56) References Cited

U.S. PATENT DOCUMENTS

| | | |
|---|---|---|
| 7,115,888 B2 | 10/2006 | Hachiya et al. |
| 7,298,977 B2 | 11/2007 | Ohsawa et al. |
| 7,315,130 B1 | 1/2008 | Chen et al. |

(Continued)

FOREIGN PATENT DOCUMENTS

| | | |
|---|---|---|
| JP | 06-077532 A | 3/1994 |
| JP | 2002-141492 A | 5/2002 |

(Continued)

OTHER PUBLICATIONS

International Search Report for corresponding International Application No. PCT/JP2011/007306 mailed Feb. 7, 2012.

(Continued)

*Primary Examiner* — Long Nguyen
(74) *Attorney, Agent, or Firm* — Renner, Otto, Boisselle & Sklar, LLP

(57) ABSTRACT

A light-emitting diode driver circuit and an LED light source which are capable of reliably turning OFF an LED even when an input voltage having a value smaller than a predetermined value is supplied. A light-emitting diode driver circuit for turning ON an LED includes: an inverter which outputs electric power for driving the LED; and an inverter control circuit which controls an operation of the inverter, and when a DC voltage applied to the inverter control circuit has a value smaller than the predetermined value, the inverter control circuit stops the operation of the inverter.

7 Claims, 4 Drawing Sheets

(56) References Cited

U.S. PATENT DOCUMENTS

| | | |
|---|---|---|
| 8,237,374 B2 | 8/2012 | Kitamura et al. |
| 2005/0063710 A1 | 3/2005 | Ohsawa et al. |
| 2006/0072324 A1 | 4/2006 | Hachiya et al. |
| 2008/0088252 A1* | 4/2008 | Chen et al. ............ 315/224 |
| 2009/0295298 A1* | 12/2009 | Chen et al. ............ 315/185 R |
| 2010/0052566 A1 | 3/2010 | Kitamura et al. |
| 2011/0148319 A1 | 6/2011 | Terazawa |
| 2012/0074868 A1* | 3/2012 | Tseng et al. ............ 315/294 |
| 2012/0268033 A1 | 10/2012 | Kitamura et al. |

FOREIGN PATENT DOCUMENTS

| | | |
|---|---|---|
| JP | 2002-218761 A | 8/2002 |
| JP | 2003-174415 A | 6/2003 |
| JP | 2006-108260 A | 4/2006 |
| JP | 2006-280123 A | 10/2006 |
| JP | 2007-142057 A | 6/2007 |
| JP | 2007-184500 A | 7/2007 |
| JP | 2008-269860 A | 11/2008 |
| JP | 2009-302017 A | 12/2009 |
| JP | 2010-057331 A | 3/2010 |
| JP | 2010-086943 A | 4/2010 |
| JP | 2010-515229 A | 5/2010 |
| JP | 2011-048985 A | 3/2011 |
| WO | WO 2008/082786 A1 | 7/2008 |

OTHER PUBLICATIONS

Form PCT/ISA/237 for corresponding International Application No. PCT/JP2011/007306 dated Feb. 7, 2012.

* cited by examiner

LIGHT-EMITTING DIODE DRIVER CIRCUIT AND LED LIGHT SOURCE

TECHNICAL FIELD

The present invention relates to a light-emitting diode driver circuit and an LED light source including the same.

BACKGROUND ART

Light-emitting diodes (LEDs) are expected to be used as a next-generation new light source in conventionally known lighting apparatuses including fluorescent lights and incandescent lamps because of their high efficiency and long life. Thus, research and development for LED light sources using the LEDs are proceeding. Along with this, development of light-emitting diode driver circuits for driving the LEDs is also proceeding.

Conventionally, as such a light-emitting diode driver circuit, a light-emitting diode driver apparatus as shown in FIG. 4 is proposed (Patent Literature (PTL) 1). FIG. 4 is a diagram showing a circuit configuration of a conventional light-emitting diode driver apparatus disclosed in PTL 1.

As shown in FIG. 4, a conventional light-emitting diode driver apparatus 100 is an LED driver circuit for turning ON an LED 200, and includes a rectifier circuit 110, a light-emitting diode driver semiconductor circuit 120, a smoothing capacitor 111, a choke coil 112, and a diode 113.

The rectifier circuit 110 is a bridge type full-wave rectifier circuit including four diodes, and two opposite ends are connected to an AC power source and the other two opposite ends are connected to the smoothing capacitor. An AC supply voltage from the AC power source is full-wave rectified by the rectifier circuit 110 and smoothed by the smoothing capacitor 111, generating a DC input voltage Vin.

An end of the choke coil 112 is connected to the high electrical potential side of the smoothing capacitor 111 and the other end of the choke coil 112 is connected to the anode side of the LED 200. Moreover, the cathode terminal of the diode 113 is connected to the high electrical potential side of the smoothing capacitor 111. The diode 113 is connected to the choke coil 112 and the LED 200 in parallel, and supplies back electromotive force generated in the choke coil 112 to the LED 200.

The light-emitting diode driver semiconductor circuit 120 is connected to the cathode terminal of the LED 200, and controls an LED block circuit including the choke coil 112, the diode 113, and the LED 200.

The light-emitting diode driver semiconductor circuit 120 includes a drain terminal 120D for receiving an output voltage from the LED 200, a ground/source terminal 120GS connected to a ground potential, and a VCC terminal (reference voltage terminal) 120Vcc for outputting a reference voltage Vcc. The light-emitting diode driver semiconductor circuit 120 further includes, in the circuit configuration, a switching device block 121 for controlling a current flowing to the LED 200, a control circuit 122 for controlling the switching device block 121 based on a voltage VJ of the switching device block 121, a drain current detection circuit 123 for detecting a current flowing in the switching device block 121, and a start/stop circuit 124 for controlling a start and a stop of operations of the switching device block 121. It is to be noted that a capacitor 114 is connected between the VCC terminal 120Vcc and the ground/source terminal 120GS of the light-emitting diode driver semiconductor circuit 120.

The switching device block 121 includes a junction FET 121a and a switching device 121b that is an N-type MOSFET connected in series to each other.

The control circuit 122 includes a regulator 122a for regulating the reference voltage Vcc at a constant value, an oscillator 122b for outputting a MAXDUTY signal and CLOCK, and an ON-time blanking pulse generator 122c for providing, to an AND circuit, pulses for setting time period in which the detection of the current is not performed. The control circuit 122 intermittently turns ON/OFF the switching device 121b at a predetermined oscillation frequency based on an output signal from the start/stop circuit 124 and an output signal from the drain current detection circuit 123. An end of the regulator 122a in the control circuit 122 is connected between the junction FET 121a and the switching device 121b, and the other end is connected to the VCC terminal 120Vcc. The regulator 122a receives the voltage VJ, regulates the reference voltage Vcc at a constant level, and provides the reference voltage Vcc to the VCC terminal 120Vcc.

The drain current detection circuit 123 is a comparator, which outputs a signal indicating High when the voltage VJ is higher than a detected reference voltage Vsn and outputs a signal indicating Low when the voltage VJ is lower than the detected reference voltage Vsn. The current flowing in the switching device 121b is detected by comparing an ON-voltage of the switching device 121b and the detected reference voltage Vsn of the drain current detection circuit 123.

The start/stop circuit 124 receives the reference voltage Vcc, and outputs a start signal (output signal indicating High) when the reference voltage Vcc is higher than or equal to a predetermined value, and outputs a stop signal (output signal indicating Low) when the reference voltage Vcc is lower than the predetermined value.

In the conventional light-emitting diode driver apparatus 100 configured as above, an ON/OFF control of the switching device 121b is performed as described above by the control circuit 122 in the light-emitting diode driver semiconductor circuit 120.

When the switching device 121b is ON, the input voltage Vin causes a current to flow in a direction from the choke coil 112 to the LED 200, and then to the light-emitting diode driver semiconductor circuit 120 to turn ON the LED 200. At this time, magnetic energy is accumulated in the choke coil 112 due to the current flowing in the choke coil 112.

Moreover, when the switching device 121b is OFF, the back electromotive force generated by the magnetic energy accumulated in the choke coil 112 causes a current to flow in a closed loop of the LED block circuit including the choke coil 112, the LED 200, and the diode 113 in a direction from the choke coil 112 to the LED 200, and then to the diode 113. As a result, the LED 200 is turned ON.

As described above, the conventional light-emitting diode driver apparatus 100 is capable of controlling the current flowing to the LED 200 at a constant current even when the input voltage varies.

CITATION LIST

Patent Literature

[PTL 1] Japanese Unexamined Patent Application Publication No. 2006-108260

SUMMARY OF INVENTION

Technical Problem

However, the conventional light-emitting diode driver apparatus 100 requires the light-emitting diode driver semiconductor circuit 120, which is an integrated circuit (IC), to operate even when the supply of the input voltage Vin is stopped, and thus needs to provide a current to the regulator 122a (an IC power source) and the like.

Therefore, the conventional light-emitting diode driver apparatus 100 has a problem in that, even when the supply of the input voltage Vin is stopped for turning the LED 200 OFF, very small current flows in the LED 200 via the junction FET 121a, and thus the LED is not completely turned OFF. That is, there is a problem that the LED 200 keeps emitting light without being completely turned OFF even when the LED 200 is intended to be turned OFF. This problem is more significantly caused especially when the number of LEDs 200 is small.

More specifically, there is a need to supply a current to the power circuit inside the IC to cause the circuit inside the IC to normally operate and maintain the state of the signal which indicates the switch is OFF. The IC driver current has to flow into the switching device 121a inside the IC via the LED 200. As a result, the very small current for driving the IC causes the LED 200 to emit weak light.

Other than in the light-emitting diode driver apparatus 100 shown in FIG. 4, the problem as above may arise also in the case of a light-emitting diode driver apparatus without the light-emitting diode driver semiconductor circuit 120.

For example, it is the case where an LED lighting apparatus such as a ceiling light has a remote controller switch for remotely turning ON the LED or controlling lighting of the LED, or has a night-light switch (a firefly switch) which is a wall switch having a small green LED lamp that emits light when the lighting apparatus is OFF so that the position of the wall switch can be specified in a dark room when the lighting apparatus is OFF.

When the apparatus has an electronic switch including the above remote control switch and the night-light switch, a circuit is used which includes a triac (thyristor) connected to an AC power source and a controller (IC) for controlling the triac. The triac requires a current flowing therein for maintaining an operation state. Therefore, a problem arises that even when the LED is intended to be turned OFF, an input voltage lower than an input voltage Vd, which is a voltage for turning ON the LED, is supplied. As a result, the LED keeps emitting light without being completely turned OFF as described above, or the electronic switch erroneously works.

The present invention was conceived in view of the above problem and has an object to provide a light-emitting diode driver circuit and an LED light source which is capable of reliably turning OFF the LED even when an input voltage lower than an expected voltage is supplied.

Solution to Problem

In order to solve the above problem, a light-emitting diode driver circuit according to the present invention is a light-emitting diode driver circuit for turning ON a light-emitting diode, the circuit including: an electric power output unit configured to output electric power for driving the light-emitting diode; and a control circuit which controls an operation of the electric power output unit, in which when a DC voltage applied to the control circuit has a value smaller than a predetermined value, the control circuit stops the operation of the electric power output unit.

In this case, it is preferable that the control circuit includes: a start trigger circuit which starts and maintains the operation of the electric power output unit; and a stop circuit which stops an operation of the start trigger circuit, in which the DC voltage is applied to the stop circuit, and when the DC voltage applied to the stop circuit has a value smaller than the predetermined value, the stop circuit stops the operation of the start trigger circuit and the operation of the electric power output unit.

Moreover, it is preferable that the electric power output unit includes a switching device for converting electric power provided to the electric power output unit, the electric power being provided for driving the light-emitting diode.

Moreover, it is preferable that the start trigger circuit (a) includes: a first resistor; a capacitor connected to the first resistor in series; and a trigger diode connected to a connection point between the first resistor and the capacitor, and (b) starts the operation of the electric power output unit as a result of a predetermined voltage held in the capacitor causing the trigger diode to conduct electric power.

Moreover, it is preferable that the stop circuit (a) includes: a second resistor; and another switching device which is different from the switching device and is connected to the second resistor and connected in parallel to the capacitor in the start trigger circuit, and (b) stops the operation of the start trigger circuit as a result of said another switching device being turned ON.

Moreover, another light-emitting diode driver circuit according to the present invention is a light-emitting diode driver circuit for turning ON a light-emitting diode, the circuit including: an inverter which outputs electric power for driving the light-emitting diode; and an inverter control circuit which controls an operation of the inverter, in which when a DC voltage applied to the inverter control circuit has a value smaller than a predetermined value, the inverter control circuit stops the operation of the inverter. The inverter includes: a first switching device; a second switching device connected to the first switching device in series; and a driving transformer, in which the first switching device and the second switching device are alternately turned ON and OFF due to inducing oscillation generated by the driving transformer.

In this case, it is preferable that the first switching device and the second switching device are bipolar transistors.

Moreover, an LED light source according to the present invention includes: any of the above light-emitting diode driver circuits; and a light-emitting diode which is turned ON by the light-emitting diode driver circuit.

Advantageous Effects of Invention

According to the present invention, it is possible to reliably turn OFF an LED even when an input voltage having a value smaller than a predetermined value is supplied.

Moreover, it is possible to prevent an error in a semiconductor switch such as a firefly night-light switch.

DESCRIPTION OF EMBODIMENTS

Hereinafter, a light-emitting diode driver circuit and an LED light source according to embodiments of the present invention will be described with reference to the drawings. It is to be noted that each of the embodiments described below shows a preferred illustrative embodiment of the present invention. Therefore, the numerical values, shapes, materials, structural elements, the arrangement and connection of the structural elements, and so on are mere examples, and therefore do not limit the scope of the present invention. The present invention is limited only by the scope of Claims. Thus, among the structural elements in the following embodiments, structural elements not recited in any one of the independent claims defining the most generic part of the present invention are not necessarily required to achieve the object of the present invention, but will be described as structural elements for preferable embodiments.

Embodiment 1

Figure 1:
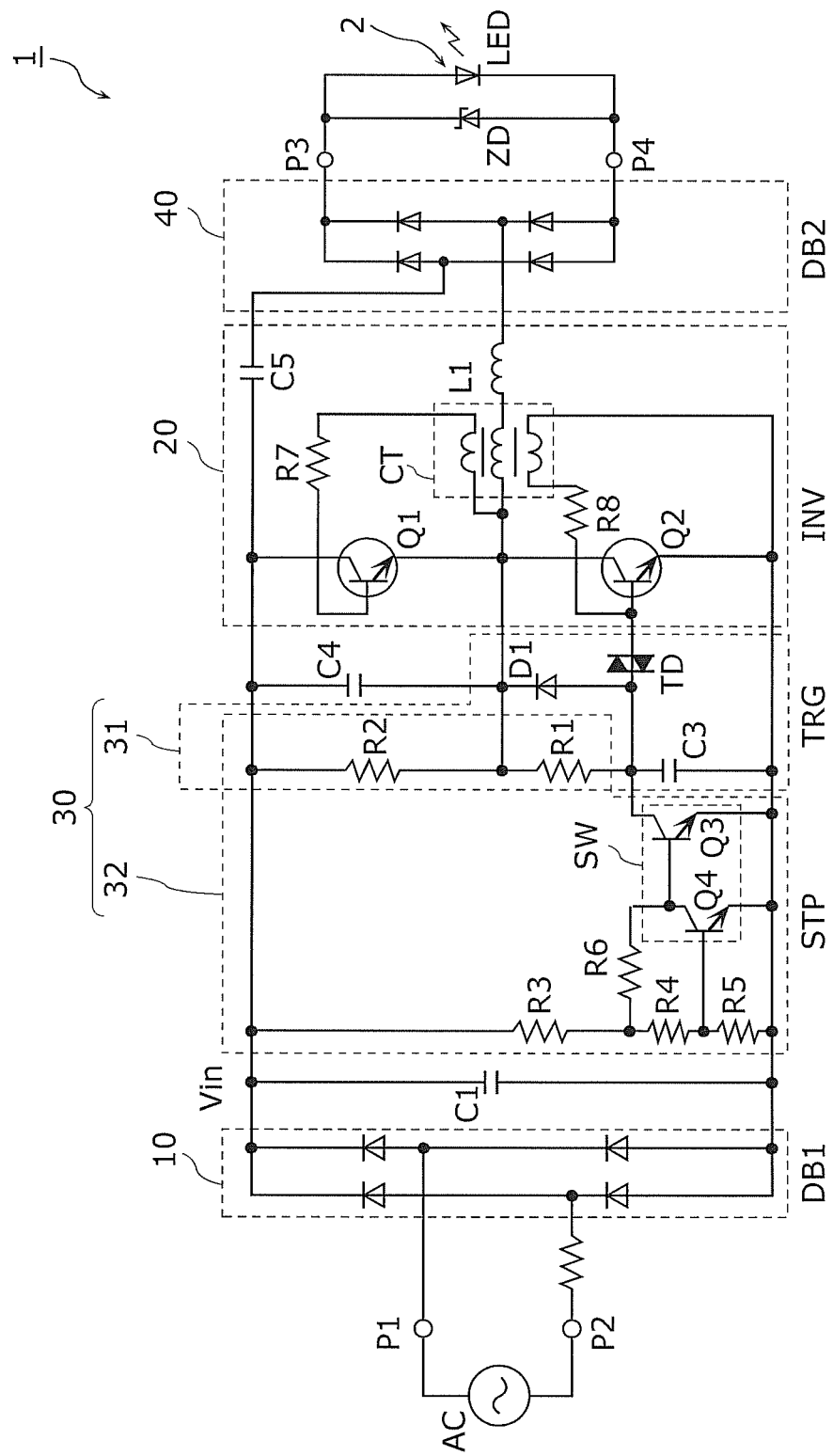
FIG. 1 is a diagram showing a circuit configuration of a light-emitting diode driver circuit according to Embodiment 1 of the present invention.

The following describes a circuit configuration of a light-emitting diode driver circuit according to Embodiment 1 of the present invention with reference to FIG. 1. FIG. 1 is a diagram showing the circuit configuration of the light-emitting diode driver circuit according to Embodiment 1 of the present invention.
(Circuit Configuration)
As shown in FIG. 1, a light-emitting diode driver circuit 1 according to Embodiment 1 of the present invention is an LED driver circuit for turning ON an LED 2 (LED lighting circuit), and includes a first rectifier circuit 10, an inverter 20, an inverter control circuit 30, and a second rectifier circuit 40.

The light-emitting diode driver circuit 1 has input terminals P1 and P2 for receiving an input of an AC voltage. The input terminals P1 and P2 are connected to an AC power source and to input terminals of the first rectifier circuit 10. For example, the input terminals P1 and P2 of the light-emitting diode driver circuit 1 are connected to a commercial AC power source through a wall switch. It is to be noted that the commercial AC power source is an AC power source of 100V, that is, a household AC power source. Moreover, each of the input terminals P1 and P2 is, for example, a cap of an LED bulb lamp to be attached to a socket to which AC power is supplied.

Moreover, the light-emitting diode driver circuit 1 has output terminals P3 and P4 for outputting a DC voltage. The output terminals P3 and P4 are connected to the LED 2 and to output terminals of the second rectifier circuit 40. The high electrical potential side of the output terminal P3 is connected to the anode side of the LED 2, and the low electrical potential side of the output terminal P4 is connected to the cathode side of the LED 2. The LED 2 is turned ON by the DC voltage supplied from the light-emitting diode driver circuit 1. It is to be noted that, in this embodiment, a zener diode ZD is connected in parallel to the LED 2 for electrostatic protection of the LED 2.

The following describes details of structural elements of the light-emitting diode driver circuit 1 according to this embodiment.

First, the first rectifier circuit 10 is described. The first rectifier circuit 10 (DB1) is a bridge type full-wave rectifier circuit including four diodes. In the first rectifier circuit 10, two input terminals are connected to the AC power source via the input terminals P1 and P2, and two output terminals are connected to a smoothing capacitor C1 and others. It is to be noted that the smoothing capacitor C1 is provided for the purpose of stabilizing an output voltage of the first rectifier circuit 10, and is an electrolytic capacitor, for example.

The first rectifier circuit 10 receives an AC voltage from the commercial AC power source through the wall switch, for example, and full-wave rectifies the received AC voltage to output a DC voltage. The DC voltage outputted from the first rectifier circuit 10 is smoothed by the smoothing capacitor C1 to be an input voltage Vin which is a DC voltage. The input voltage Vin is supplied to the inverter 20 and the inverter control circuit 30.

Next, the inverter 20 is described. The inverter 20 (INV) is an example of an electric power output unit which outputs electric power for driving the LED 2. In this embodiment, an inverter for converting a DC voltage into an AC voltage is employed. The inverter 20 includes a first switching device Q1, a second switching device Q2 connected to the first switching device Q1 in series, a driving transformer CT, an inductor L1, and a resonance capacitor C5.

In this embodiment, the inverter 20 is a half-bridge type self-excited inverter including a series circuit connected to a DC power source. The series circuit includes the first switching device Q1 and the second switching device Q2 connected in series to each other which alternately perform switching operations. Moreover, in this embodiment, the first switching device Q1 and the second switching device Q2 are bipolar transistors. It is to be noted that, in this embodiment, the self-excited inverter is an inverter which receives a feedback using a driving transformer and plural switching devices.

The collector of the first switching device Q1 is connected to the positive electrode of the DC voltage output terminals in the first rectifier circuit 10 and to the resonance capacitor C5. The emitter of the first switching device Q1 is connected to the collector of the second switching device Q2 and a coil of the driving transformer CT. Moreover, the base of the first switching device Q1 is connected to the coil of the driving transformer CT via a resistor R7.

The collector of the second switching device Q2 is connected to the emitter of the first switching device Q1 and the coil of the driving transformer CT. The emitter of the second switching device Q2 is connected to the negative electrode of the DC voltage output terminals in the first rectifier circuit 10 and to the coil of the driving transformer CT. Moreover, the base of the second switching device Q2 is connected to the coil of the driving transformer CT.

The driving transformer CT includes winding coils which are a primary winding (input winding) and a secondary winding (output winding).

It is to be noted that the inductor L1 is a choke inductor, an end of which is connected to the output side of the driving transformer CT and the other end of which is connected to the input side of the second rectifier circuit 40. Moreover, an end of the resonance capacitor C5 is connected to the positive electrode of the DC voltage output terminals in the first rectifier circuit 10, and the other end of the resonance capacitor C5 is connected to the input side of the second rectifier circuit 40.

The inverter 20 configured as above operates with a predetermined input voltage Vin applied to the both terminals of the series circuit including the first switching device Q1 and the second switching device Q2 (to the input terminals of the inverter 20), and a start control signal (trigger signal) supplied from the inverter control circuit 30. In the inverter 20, alternate ON/OFF operations performed by the first switching device Q1 and the second switching device Q2 which are caused by a self-oscillation induced by the driving transformer CT causes series resonance between the inductor L1 and the resonance capacitor C5 to induce an AC secondary voltage, which is supplied to the second rectifier circuit 40.

Next, the following describes the inverter control circuit 30 for controlling the inverter 20 which is the electric power output unit. The inverter control circuit 30 controls operations of the inverter 20. More specifically, the inverter control circuit 30 stops an operation of the inverter 20 when the DC input voltage Vin provided to the inverter control circuit 30 has a value smaller than a predetermined value (Vth), for example, when the DC input voltage is lower than a reference input voltage (Vd) and is a very low voltage (Vmin) within a range in which the LED 2 can be turned ON. In this regard, the reference input voltage (Vd) is a voltage for turning ON/OFF the LED 2.

In this embodiment, the inverter control circuit 30 includes a start trigger circuit 31 (TRG) for starting an operation of the inverter 20 and maintaining the operation, and a stop circuit 32 (STP) for stopping the operation of the start trigger circuit 31. When the DC input voltage Vin has a value smaller than the above predetermined value, the stop circuit 32 operates to stop the operation of the start trigger circuit 31. As a result, the inverter 20 stops operating and the power supply to the LED 2 completely stops. Here, the following describes details of specific configurations of the start trigger circuit 31 and the stop circuit 32 in the inverter control circuit 30.

The start trigger circuit 31 includes a resistor R1 which is a first resistor, a capacitor C3 connected to the resistor R1 in series, and a trigger diode TD connected to a connection point between the resistor R1 and the capacitor C3.

The resistor R1 is connected to the positive electrode of the DC voltage output terminals in the first rectifier circuit 10 via the resistor R2, and to the negative electrode of the DC voltage output terminals in the first rectifier circuit 10 via the capacitor C3. The capacitor C3 is a capacitor for controlling conduction of the trigger diode TD, and the high electrical potential side of the capacitor C3 is connected to the resistor R1 and the low electrical potential side of the capacitor C3 is connected to the negative electrode of the DC voltage output terminals in the first rectifier circuit 10. It is to be noted that, in the start trigger circuit 31, the resistor R1 and the capacitor C3 constitute a time constant circuit.

Moreover, the trigger diode TD is a trigger device including a diode and enters a conducting state when a voltage exceeding a specified voltage (breakover voltage) is applied. In this embodiment, the trigger diode TD enters the conducting state when a voltage held in the capacitor C3 exceeds the breakover voltage. Moreover, the trigger diode TD is connected to the base of the second switching device Q2 which is a terminal for controlling the inverter 20, and the inverter 20 starts operating as a result of the trigger diode TD entering the conducting state.

That is, the second switching device Q2 is turned ON by the start trigger circuit 31 and thus a current starts flowing in the inverter circuit 20. The current flows from the inductor L1 to the resonance capacitor C5, the second rectifier circuit 40, the driving transformer CT, the LED 2, and the second switching device Q2 in this order. As a result, resonance among the inductor L1, the resonance capacitor C5, and the driving transformer CT inverts voltages generated in the bases of the first switching device Q1 and the second switching device Q2 at a resonance frequency, so that the first switching device Q1 and the second switching device Q2 start a regular operation of switching alternately ON/OFF.

It is to be noted that, for example, a diode AC switch (DIAC) having a voltage breakover of from 30 to 34V can be used as the trigger diode TD.

As described above, the start trigger circuit 31 is a circuit for starting the inverter 20 and includes the time constant circuit having the resistor R1 and the capacitor C3, and the trigger diode TD which breaks over according to the voltage of the capacitor C3. Then, an input of a trigger signal from the start trigger circuit 31 to the inverter 20 starts the self-oscillation of the inverter 20.

Moreover, in this embodiment, the start trigger circuit 31 includes the resistor R2 connected to the resistor R1 in series and the diode D1 connected to the resistor R1 in parallel. The diode D1 is a diode for rectification and the anode side of the diode D1 is connected to a connection point between the resistor R1 and the capacitor C3 and to the trigger diode TD. Moreover, the cathode side of the diode D1 is connected to the connection point between the resistor R1 and the resistor R2, to the connection point between the first switching device Q1 (emitter) and the second switching device Q2 (collector), and to a capacitor C4. It is to be noted that the high potential side of the capacitor C4 is connected to the positive electrode of the DC voltage output terminals in the first rectifier circuit 10 and the collector of the first switching device Q1, and the low electrical potential side of the capacitor C4 is connected to the cathode of the diode D1. The capacitor C4 is a capacitor for soft switching, and is optionally used for suppressing generation of noise caused by switching.

The stop circuit 32 is a circuit for completely turning OFF the LED 2 by stopping the operation of the inverter circuit 20, for example, when the LED 2 is turned OFF through the semiconductor switch such as the firefly night-light switch. The stop circuit 32 according to this embodiment includes the resistor R1 as a second resistor, a third switching device Q3 connected to the resistor R1, and the fourth switching device Q4 connected to the third switching device Q3. The resistor R1 is shared by the start trigger circuit 31 and the stop circuit 32. Moreover, the third switching device Q3 and the fourth switching device Q4 constitute a switching circuit SW, and switching ON the switching circuit SW stops the operation of the start trigger circuit. In this embodiment, the stop circuit 32 further includes the resistor R2, the resistor R3, the resistor R4, the resistor R5, and the resistor R6.

In the switching circuit SW, the third switching device Q3 and the fourth switching device Q4 are bipolar transistors.

The third switching device Q3 is connected in parallel to the capacitor C3 in the start trigger circuit 31, and the collector of the third switching device Q3 is connected to the high electrical potential side of the capacitor C3 and to the positive electrode of the DC voltage output terminals in the first rectifier circuit 10 via the resistor R1 and the resistor R2. The emitter of the third switching device Q3 is connected to the low electrical potential side of the capacitor C3 and to the negative electrode of the DC voltage output terminals in the first rectifier circuit 10. It is to be noted that the base of the third switching device Q3 is connected to the collector of the fourth switching device Q4.

The collector of the fourth switching device Q4 is connected to the resistor R6 and the base of the third switching device Q3. The emitter of the fourth switching device Q4 is connected to the resistor R5 and to the negative electrode of the DC voltage output terminals in the first rectifier circuit 10. Moreover, the base of the fourth switching device Q4 is connected to the connection point between the resistor R4 and the resistor R5.

An end of the resistor R3 is connected to the positive electrode of the DC voltage output terminals in the first rectifier circuit 10, and the other end is connected to the connection point between the resistor R4 and the resistor R6. An end of the resistor R4 is connected to the connection point between the resistor R3 and the resistor R6, and the other end is connected to the connection point between the resistor R5 and the base of the fourth switching device Q4. An end of the resistor R5 is connected to the connection point between the resistor R4 and the base of the fourth switching device Q4, and the other end is connected to the negative electrode of the DC voltage output terminals in the first rectifier circuit 10. An end of the resistor R6 is connected to the connection point between the resistor R3 and the resistor R4, and the other end is connected to the connection point between the base of the third switching device Q3 and the collector of the fourth switching device Q4. It is to be noted that details of the resistor R1 and the resistor R2 are as described in the description of the start trigger circuit 31.

In the stop circuit 32 configured as above, resistance values of the resistors R1 to R6 are set as follows: the forth switching device Q4 is turned OFF and the third switching device Q3 is turned ON when the input voltage Vin has a value smaller than the above predetermined value (Vth), and the forth switching device Q4 is turned ON and the third switching device Q3 is turned OFF when the input voltage Vin has a value greater than or equal to the above predetermined value (Vth). That is, the predetermined value (Vth) can be set appropriately as a threshold voltage of the switching circuit SW, for example, to a voltage value which is smaller than the value of the reference input voltage (Vd) and is the value of the very small voltage (Vmin) within a range in which the LED 2 can be turned ON. In this regard, the reference input voltage (Vd) is a voltage for turning ON/OFF the LED 2.

As described above, when the input voltage Vin has a value smaller than the above predetermined value (Vth), the switching circuit SW in the stop circuit 32 enters an ON state. That is, in this case, the ON current does not flow to the base of the fourth switching device Q4 and thus the fourth switching device Q4 is turned OFF, and a predetermined ON current flows to the base of the third switching device Q3 and thus the third switching device Q3 is turned ON. As a result, electric charges in the capacitor C3 are discharged, so that the trigger diode TD enters a non-conducting state. Accordingly, the stop circuit 32 stops the operation of the start trigger circuit 31 when the input voltage Vin has a value smaller than the above predetermined value (Vth).

On the other hand, when the input voltage Vin has a value greater than or equal to the above predetermined value (Vth), the switching circuit SW in the stop circuit 32 enters an OFF state. That is, in this case, an ON current determined by a voltage dividing ratio among the resistors R3 to R5 flows in the base of the fourth switching device Q4 to turn ON the fourth switching device Q4, and electrical potential of the base and the emitter of the third switching device Q3 reaches GND electrical potential to turn OFF the third switching device Q3. As a result, electric charges are charged in the capacitor C3. Accordingly, the capacitor C3 is charged, the voltage of the trigger diode TD reaches a conducting voltage, and then the inverter circuit 20 starts oscillating as described above. Accordingly, the stop circuit 32 does not stop the start trigger circuit 31 when the input voltage Vin has a value greater than or equal to the above predetermined value (Vth).

Next, the second rectifier circuit 40 is described. As the first rectifier circuit 10, the second rectifier circuit 40 (DB2) is a bridge type full-wave rectifier circuit including four diodes. Two input terminals of the second rectifier circuit 40 are connected to two output terminals of the inverter 20. Among the two output terminals of the second rectifier circuit 40, an output terminal having higher electrical potential is connected to the anode side of the LED 2 via the output terminal P3 and an output terminal having lower electrical potential is connected to the cathode side of the LED 2 via the output terminal P4.

The second rectifier circuit 40 receives an AC voltage from the inverter 20, full-wave rectifies the AC voltage, and supplies the full-wave rectified AC voltage to the LED 2.

It is to be noted that the second rectifier circuit 40 can be, for example, a combination of two semiconductor components each of which includes two schottky diodes connected in series to each other.

The light-emitting diode driver circuit 1 according to this embodiment is configured as described above. It is to be noted that, as examples of the above circuit devices in the light-emitting diode driver circuit 1 according to this embodiment, chip resistors having the following resistance are used as the resistors R1 to R8: R1=120 kΩ, R2=150 kΩ, R3=390 kΩ, R4=82 kΩ, R5=9.3 kΩ, R6=100 kΩ, R7=R8=12Ω, and capacitors having the following capacitance are used as the capacitors C1 and C3 to C5: C1=2.2 μF, C3=6800 pF, C4=1500 pF, C5=0.047 μF. Moreover, one LED 2 is provided in this embodiment, but plural LEDs 2 may be provided. In this case, the plural LEDs 2 may be connected in series or in parallel, or the series connection and the parallel connection may be combined.

(Circuit Operation)

Next, operations of the light-emitting diode driver circuit 1 according to this embodiment are described.

For example, when a user operates the wall switch for turning the LED 2 ON, AC power is supplied to the input terminals P1 and P2, and thus the first rectifier circuit 10 generates a smoothed DC input voltage Vin. The input voltage Vin is supplied to the input terminals of the inverter 20, to the input terminals of the start trigger circuit 31, and to the input terminals of the stop circuit 32. At this time, the reference input voltage (Vd), which is a voltage for turning ON the LED 2, is supplied as the input voltage Vin.

Accordingly, the start trigger circuit 31 and the inverter 20 operate. That is, by supplying the reference input voltage (Vd) to the start trigger circuit 31 as the input voltage Vin, the capacitor C3 in the start trigger circuit 31 is charged and causes the trigger diode TD to break over. As a result, the trigger diode TD enters a conducting state, a trigger signal (trigger pulse) is supplied to the base of the second switching device Q2 in the inverter 20, and thus the second switching device Q2 is turned ON.

After the second switching device Q2 is turned ON in response to the trigger signal, the inverter is started, and the self-oscillation induced by the driving transformer CT causes the first switching device Q1 and the second switching device Q2 to alternately perform ON/OFF operations, which induces the AC secondary voltage. Accordingly, the secondary voltage is increased by the series resonance between the inductor L1 and the resonance capacitor C5, and the resulting AC voltage is supplied to the second rectifier circuit 40. Subsequently, the AC voltage is full-wave rectified by the second rectifier circuit 40, and a predetermined DC voltage (forward voltage VF) is supplied to the LED 2 via the output terminals P3 and P4. With this, the LED 2 emits light with desired brightness.

It is to be noted that, at this time, supply of the reference input voltage (Vd) causes the switching circuit SW in the stop circuit 32 to enter an OFF state. That is, the fourth switching device Q4 is turned ON, the third switching device Q3 is turned OFF, and the stop circuit 32 does not act on the start trigger circuit 31.

Next, the user's operation on the wall switch for turning OFF the LED 2 stops the supply of the AC power to the input terminals P1 and P2, thereby basically turning OFF the LED 2.

However, in the conventional light-emitting diode driver apparatus, other IC circuits (not shown) or electronic switches such as a remote control switch and a night-light switch (not shown) may supply, as an input voltage Vin, a voltage which is lower than the reference input voltage (Vd) and is the very low voltage (Vmin) within a range in which the LED can be turned ON.

Conventionally, there has been a problem that supply of the very low voltage (Vmin) in the circuit turns ON the LED 2. However, in this embodiment, supply of the very low voltage (Vmin) does not turns ON the LED 2. The details are described below.

In this embodiment, even when the very low voltage (Vmin) is supplied as the input voltage Vin, the stop circuit 32 is started in which an operation start voltage (Vth) is set to a voltage higher than the very low voltage (Vmin), to stop the operation of the inverter 20.

More specifically, supply of the very low voltage (Vmin) as the input voltage Vin turns OFF the third switching device Q3 and turns ON the fourth switching device Q4 in the stop circuit 32. With this, the electric charges stored in the capacitor C3 in the start trigger circuit 31 are discharged, and thus the trigger diode TD enters a non-conducting state. As a result, the start trigger circuit 31 stops supplying the trigger pulse to the base of the second switching device Q2 in the inverter 20, so that the inverter 20 stops. Accordingly, power supply to the second rectifier circuit 40 is completely stopped, and thus the LED 2 is turned OFF without fail.

Example 1

The following describes the result of an experiment that was performed with regard to the stop circuit 32 in the light-emitting diode driver circuit 1 according to this embodiment. Tables 1 and 2 below show, with regard to the LED lamp having the light-emitting diode driver circuit 1 according to this embodiment, the relationship among power consumption (standby electricity) of the stop circuit 32, an ON/OFF operation state of the LED lamp, and lighting state of an LED indicator of an experimental switch. It is to be noted that an LED bulb lamp was used as the LED lamp for the experiment.

Moreover, Table 1 shows the case where a remote control switch ("Tottara Rimocon" made by Panasonic corp.: WTC53215K) is used as the experimental switch, and Table 2 shows the case where a night-light switch ("Hotaru Switch" made by Panasonic corp.: WN5052) is used as the experimental switch. Criteria for judgment in the tables is as follows: regarding the ON/OFF operation state of the lamp, "O" is shown when the ON/OFF operation works and "X" is shown when the ON/OFF operation does not work; regarding the lighting state of the LED indicator, "O" is shown when the LED indicator correctly emits light and "X" is shown when the LED indicator does not emit light. It is to be noted that, regarding the lighting state of the LED indicator, "Δ" is shown when the LED indicator emits light slightly weaker although having no problem as a product.

TABLE 1

(Remote control switch)

| Power consumption (standby electricity) of stop circuit [W] | ON/OFF operation state of LED lamp | Lighting state of LED indicator | General judgment |
|---|---|---|---|
| 0.06 | X | X | X |
| 0.08 | O | Δ | Δ |
| 0.11 | O | O | O |
| 0.15 | O | O | O |

TABLE 2

(Night-light switch)

| Power consumption (standby electricity) of stop circuit [W] | ON/OFF operation state of LED lamp | Lighting state of LED indicator | General judgment |
|---|---|---|---|
| 0.06 | X | X | X |
| 0.08 | O | Δ | Δ |
| 0.11 | O | O | O |
| 0.15 | O | O | O |

As is seen from Tables 1 and 2, it was found that the light-emitting diode driver circuit 1 and the electronic switches correctly operate when the power consumption (standby electricity) in the stop circuit 32 is more than or equal to 0.08 W. It is to be noted that since the stop circuit 32 consumes electricity also when the LED lamp is ON, too much standby electricity decreases an efficiency of the LED lamp. Therefore, considering rating of the night-light switch at 20% and variations, as a practical range of use, the standby electricity of the stop circuit 32 is preferably up to 0.11 W.

As described above, with the light-emitting diode driver circuit 1 according to Embodiment 1 of the present invention, ON/OFF of the LED 2 can be controlled by a start and a stop of the inverter 20, and the inverter control circuit 30 completely stops the operation of the inverter 20 when the input voltage Vin has a value smaller than the predetermined value. With this, it is possible to completely interrupt a path of current flowing to the LED 2. Therefore, when the LED 2 is desired to be turned OFF, it is possible to turn the LED 2 completely OFF.

Moreover, the light-emitting diode driver circuit 1 according to this embodiment has a configuration in which a current is bypassed from the resistors through the transistors (the third transistor Q3 and the fourth transistor Q4) in the stop circuit 32. Therefore, even when electronic switches such as a remote control switch and a night-light switch are equipped, the electronic switches do not erroneously work.

Moreover, according to this embodiment, since electric power is supplied to the LED 2 using the inverter 20, the AC voltage from the commercial low-frequency AC power source is converted to have a higher frequency and thus the flicker in the LED 2 at the ON state can be suppressed. It is to be noted that a flicker in the LED 2 can be prevented by high frequencies of more than or equal to 15 kHz. Furthermore, it is also possible to binarize the brightness by supplying the electric power to the LED 2 using the inverter 20.

It is to be noted that, in this embodiment, electric power consumed by the resistors and the switching devices included in the stop circuit 32 is, as described above, preferably more than or equal to 0.08 W and less than or equal to 0.11 W in the case where the above very low voltage (Vmin) is supplied to the stop circuit 32.

Moreover, in this embodiment, the driving transformer CT is not limited to the driving transformer CT disclosed in FIG. 1. For example, although a circuit including the resistor R8, the base of the second switching device Q2, the emitter of the second switching device Q2, and coils of the driving transformer connected to each other is provided in this embodiment, this circuit configuration is not necessarily needed.

Moreover, although the half-bridge type self-excited inverter is used as the electricity output unit in this embodiment, the electricity output unit according to the present invention is not limited to this. For example, as the electricity output unit, a separately-excited inverter may be used, and a full-bridge type inverter may be used instead of the half-bridge type inverter.

Embodiment 2

Figure 2:
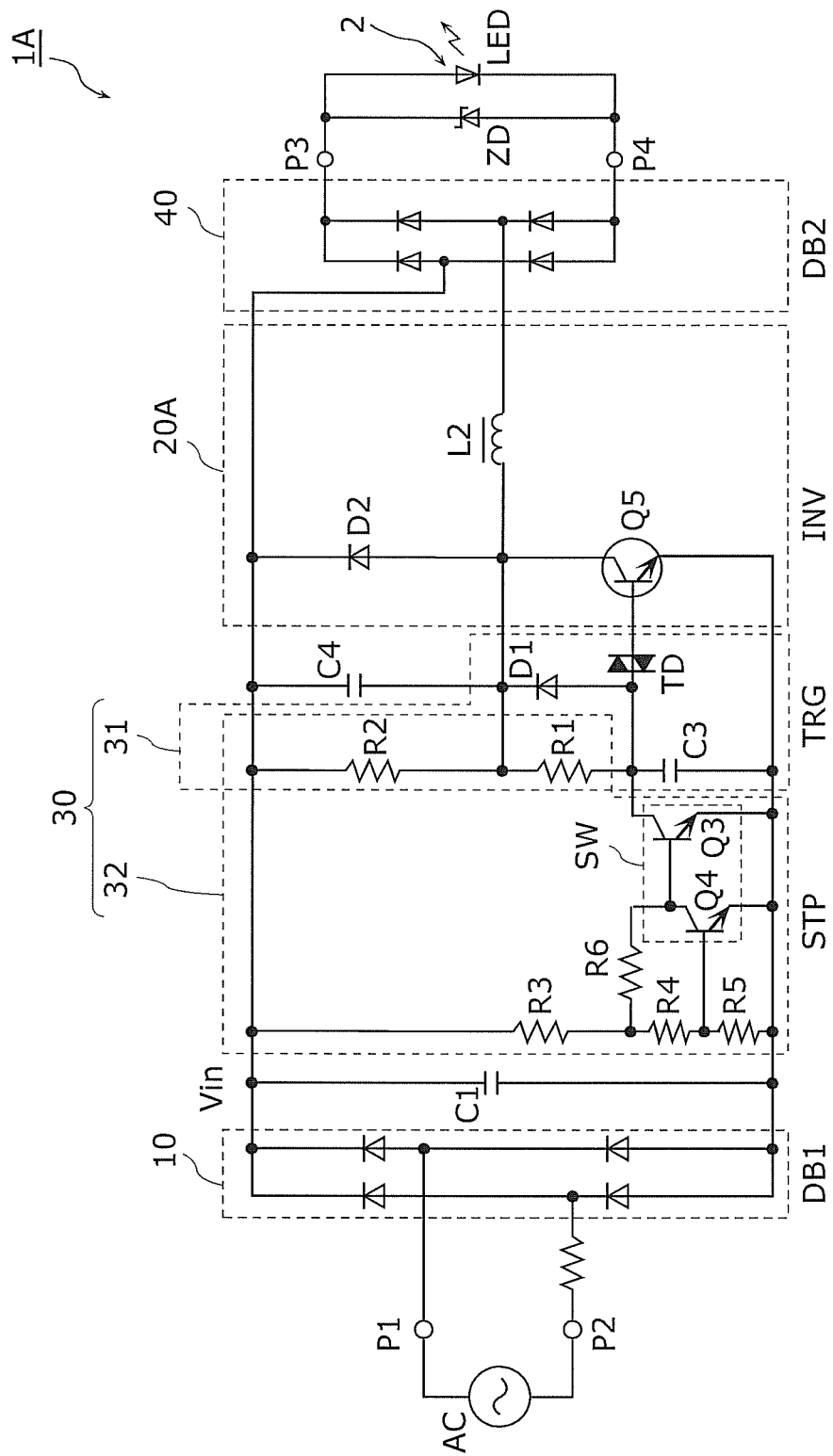
FIG. 2 is a diagram showing a circuit configuration of a light-emitting diode driver circuit according to Embodiment 2 of the present invention.

The following describes a light-emitting diode driver circuit 1A according to Embodiment 2 of the present invention with reference to FIG. 2. FIG. 2 is a diagram showing the circuit configuration of the light-emitting diode driver circuit according to Embodiment 2 of the present invention.

A basic configuration of the light-emitting diode driver circuit 1A according to Embodiment 2 of the present invention is the same as the light-emitting diode driver circuit 1 according to Embodiment 1 of the present invention. In FIG. 2, the same reference numerals are assigned to structural elements which are the same as the structural elements shown in FIG. 1, and the detailed descriptions are omitted.

The light-emitting diode driver circuit 1A according to Embodiment 2 of the present invention shown in FIG. 2 is different in the configuration of the inverter from the light-emitting diode driver circuit 1 according to Embodiment 1 of the present invention shown in FIG. 1.

That is, in the light-emitting diode driver circuit 1A according to this embodiment, an inverter 20A includes a fifth switching device Q5 the number of which is one, one diode D2, and an inductor L2.

The fifth switching device Q5 is a bipolar transistor. The emitter of the fifth switching device Q5 is connected to an end of the inductor L2 and the anode side of the diode D2. Moreover, the emitter of the fifth switching device Q5 is connected to the cathode side of the diode D1 in the start trigger circuit 31. Furthermore, the collector of the fifth switching device Q5 is connected to the negative electrode of the DC voltage output terminals in the first rectifier circuit 10. Furthermore, the base of the fifth switching device Q5 is connected to the trigger diode TD in the start trigger circuit 31.

The cathode side of the diode D2 is connected to the positive electrode of the DC voltage output terminals in the first rectifier circuit 10. Moreover, the anode side of the diode D2 is connected to a connection point between the inductor L2 and the fifth switching device Q5.

It is to be noted that an end of the inductor L2 is connected to a connection point between the fifth switching device Q5 and the diode D2, and the other end of the inductor L2 is connected to the input side of the second rectifier circuit 40.

When an input voltage Vin provided from the first rectifier circuit 10 is applied to the inverter 20A configured as above, the inverter 20A operates according to a start control signal from the inverter control circuit 30. As a result, a DC voltage is supplied from the inverter 20A to the second rectifier circuit 40.

It is to be noted that, in this embodiment, other configurations are the same as those in Embodiment 1.

Next, operations of the light-emitting diode driver circuit 1A according to this embodiment is described.

For example, when a user operates the wall switch for turning the LED 2 ON, as in Embodiment 1, a reference input voltage (Vd), which is a voltage for turning ON the LED, is supplied as the input voltage Vin, and thus the start trigger circuit 31 and the inverter 20A operate.

That is, the capacitor C3 in the start trigger circuit 31 are charged, the trigger diode TD enters a conducting state, a trigger signal (trigger pulse) is supplied to the base of the fifth switching device Q5 in the inverter 20A, and then the fifth switching device Q5 is turned ON.

When the fifth switching device Q5 is turned ON in response to the trigger signal, the input voltage Vin causes a current to flow from the second rectifier circuit 40 to the LED 2, the second rectifier circuit 40, the inductor L2, and the fifth switching device Q5 in this order, to turn ON the LED 2.

Subsequently, the electric charges in the capacitor C3 are discharged through the diode D1 and the base of the switching device Q5, the switching device Q5 and the trigger diode TD are turned OFF, and then energy stored in the inductor L2 returns to the smoothing capacitor C1 as a feedback through the diode D2 and immediately starts to be charged in the capacitor C3. When the above feedback current finishes flowing, the trigger diode TD is turned ON again and the switching device Q5 is turned ON. Moreover, for the purpose of changing an ON-time of the switching device Q5, a resistor may be added between the capacitor C3 and the diode D1.

It is to be noted that, in the stop circuit 32, supply of the reference input voltage (Vd) causes the switching circuit SW to enter an OFF state.

Next, when the user operates the wall switch for turning OFF the LED 2, the LED 2 is turned OFF.

In this case, even when a very low voltage (Vmin) is supplied as the input voltage Vin, as in Embodiment 1, the stop circuit 32 is started in which an operation start voltage (Vth) is set to a voltage higher or equal to the very low voltage (Vmin), to stop the operation of the inverter 20A. As a result, power supply to the second rectifier circuit 40 completely stops, and thus the LED 2 is turned OFF without fail.

As described above, with the light-emitting diode driver circuit 1A according to Embodiment 2 of the present invention, it is also possible to control ON/OFF of the LED 2 by a start and a stop of the inverter 20A, and the inverter control circuit 30 completely stops an operation of the inverter 20A when the input voltage Vin has a value smaller than a predetermined value. With this, it is possible to completely interrupt a path of current flowing to the LED 2. Therefore, when the LED 2 is desired to be turned OFF, it is possible to turn the LED 2 completely OFF.

Moreover, as in Embodiment 1, the light-emitting diode driver circuit 1A according to this embodiment has a configuration in which a current is bypassed from the resistors through the transistors (the third transistor Q3 and the fourth transistor Q4) in the stop circuit 32. Therefore, even when electronic switches such as a remote control switch and a night-light switch are equipped, the electronic switches do not erroneously work.

Embodiment 3

Figure 3:
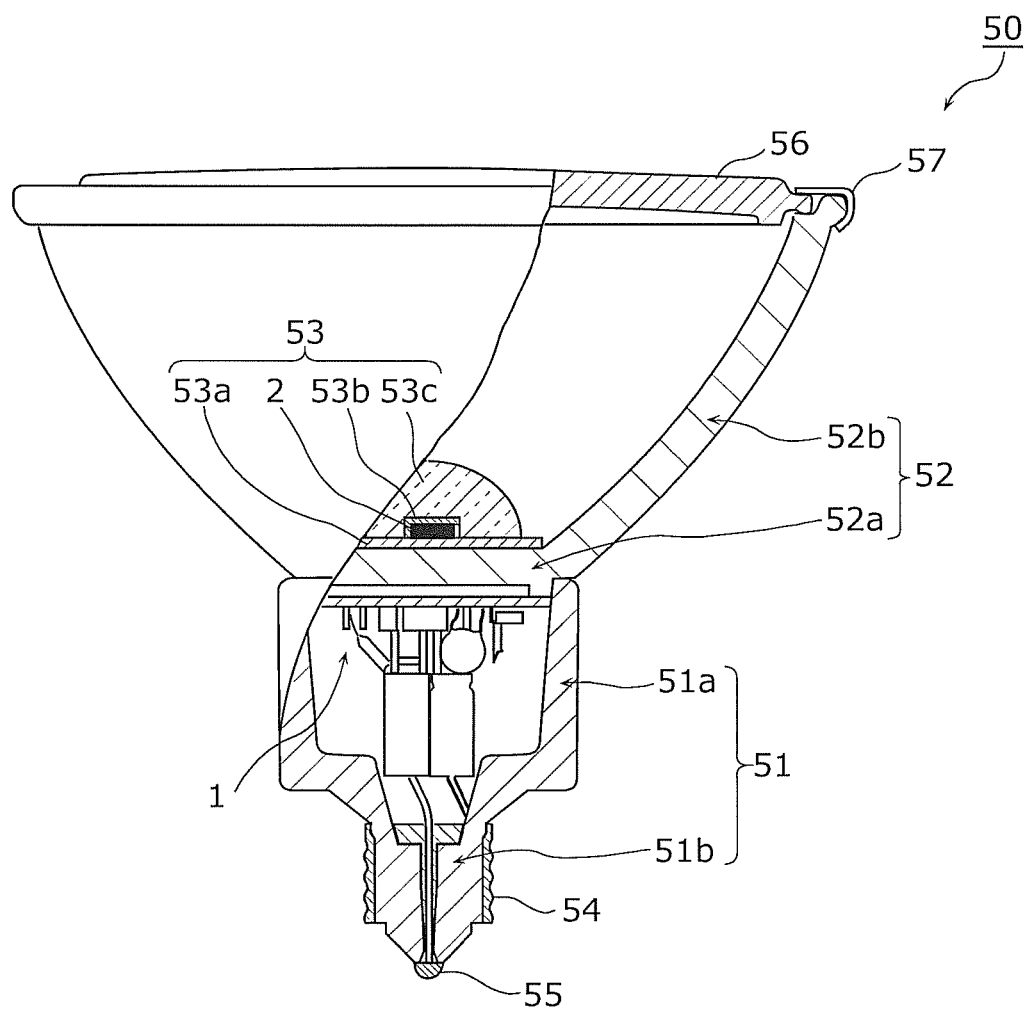
FIG. 3 is a partial sectional view of a lighting apparatus according to Embodiment 3 of the present invention.
Figure 4:
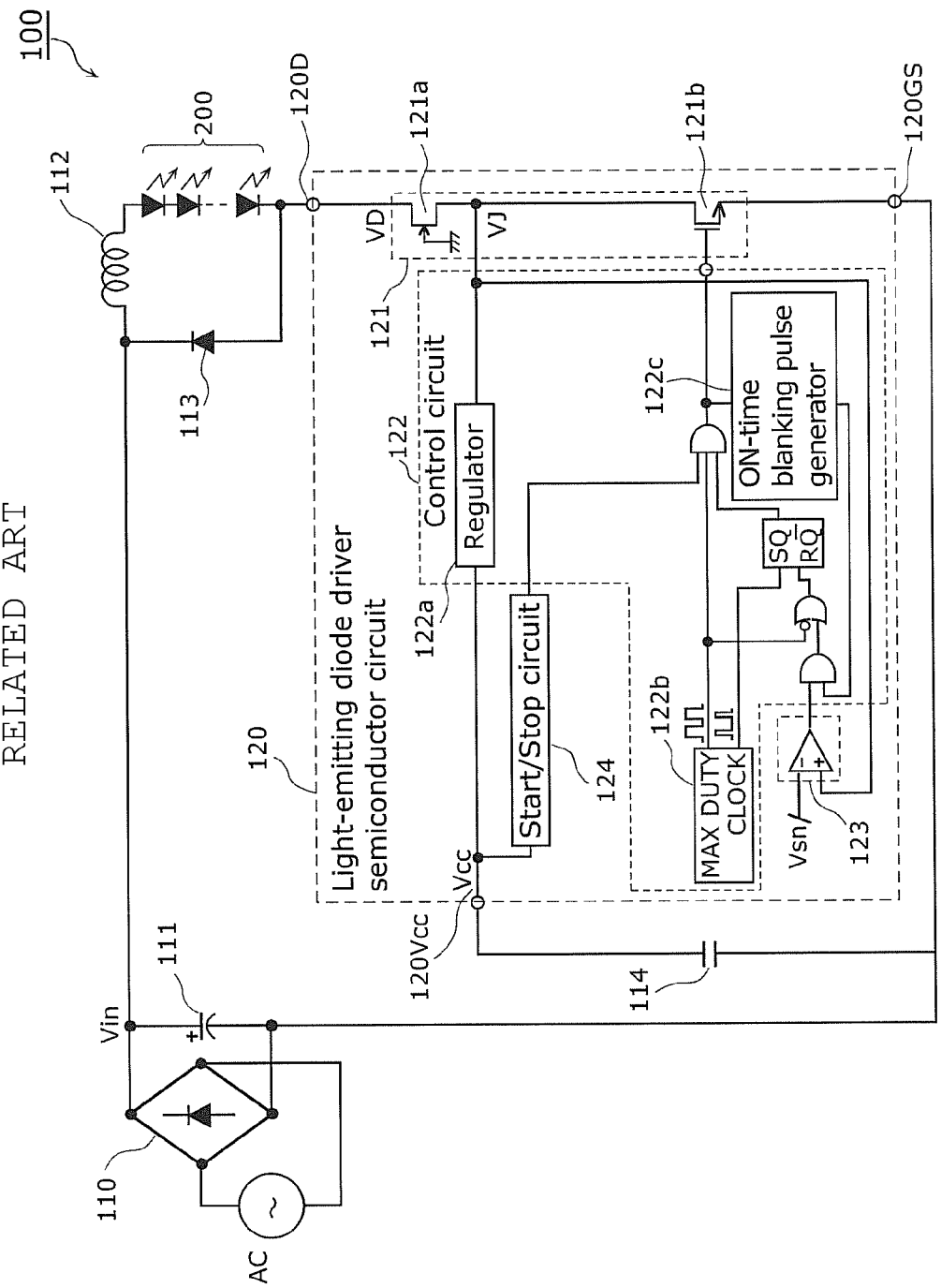
FIG. 4 is a diagram showing a circuit configuration of a conventional light-emitting diode driver apparatus.

The following describes, as Embodiment 3, an exemplary application of the light-emitting diode driver circuits according to Embodiments 1 and 2. FIG. 3 is a partial sectional view of a lighting apparatus according to Embodiment 3 of the present invention.

The light-emitting diode driver circuits 1 and 1A according to Embodiments 1 and 2 can be used as an LED light source together with the LED 2 that is turned ON by the light-emitting diode driver circuits 1 and 1A. It is to be noted that the LED light source in the present invention refers to an apparatus having an LED that is turned ON by any light-emitting diode driver circuit. Besides an apparatus in which an LED and a light-emitting diode driver circuit are simply combined, examples of the LED light source include various lighting apparatuses such as a lighting apparatus which is substituted for a conventional fluorescent bulb and a lighting apparatus which is substituted for a halogen bulb described below.

A lighting apparatus 50 according to Embodiment 3 of the present invention is an example of the above LED light source and a halogen bulb-substitution lighting apparatus having a light-emitting diode driver circuit 1, a case 51, a heat sink 52, and a light-emitting unit 53 as shown in FIG. 3.

The light-emitting diode driver circuit 1 has the same configuration as that of the light-emitting diode driver circuit 1 according to Embodiment 1.

The case 51 is made of an insulating material such as ceramics and includes a cylinder part 51a and a protruding part 51b extending from an end of the cylinder part 51a. Inside the cylinder part 51a, the light-emitting diode driver circuit 1 is contained as a lighting circuit for turning ON the LED 2. A metal shell 54 is provided on the outer periphery of the protruding part 51b and a metal eyelet 55 is provided at a sharp end of the protruding part 51b. Each of the shell 54 and the eyelet 55 is connected to the light-emitting diode driver circuit 1 via a lead wire, for example, and is a feed terminal for receiving electric power supply from an external power source (commercial AC power source). It is to be noted that the shell 54 and the eyelet 55 constitutes a cap, and the power is supplied when the cap is inserted into a socket of a lighting apparatus (not shown).

The heat sink 52 is made of metal material such as aluminum, and is cup-shaped with a bottom part 52a and a side face part 52b extending from the bottom part 52a. It is to be noted that the heat sink 52 may be made of, other than the metal material, materials such as a non-translucent ceramic material and a non-translucent resin material. On the bottom part 52a in the heat sink 52, the light-emitting unit 53 is adhered using an adhesive and the like.

Moreover, to an opening of the heat sink 52, a front cover 56 is attached which is fixed to the heat sink 52 with a metal fitting 57. The front cover 56 is made of translucent materials such as a resin, glass, and ceramics to transmit light from the light-emitting unit 53 to the exterior. It is to be noted that the front cover 56 is preferably made of a transparent material among the above translucent materials. The inner periphery of the side face part 52b of the heat sink 52 is a reflective surface for reflecting light, so that the heat sink 52 is also used as a reflecting mirror. It is to be noted that the heat sink 52 has a size smaller than or approximately equal to a conventional halogen bulb having a reflecting mirror. For example, in the case where a halogen bulb having a reflection mirror with an opening diameter of approximately from 50 mm to 70 mm is substituted, the heat sink 52 may be formed to have an opening diameter of approximately from 50 mm to 70 mm, or smaller.

The light-emitting unit 53 includes the LED2, a substrate 53a, a wavelength converting member 53b, and a lens 53c. The LED 2 is a bare chip, and one or more LEDs 2 are mounted on the substrate 53a. As the LED 2, for example, a blue LED chip which emits blue light can be used. The substrate 53a is a substrate on which the LED is mounted, and examples of the substrate 53a include a ceramic substrate and a metal substrate coated with insulating resin. As a wavelength converting member 53b, a phosphor-containing resin that is a resin containing phosphor, which is a light wavelength converting material, can be used. For example, in the case where the LED 2 is the blue LED chip, a phosphor-containing resin which is a silicon resin containing yellow phosphor particles of yttrium, aluminum, garnet (YAG) series dispersed therein can be used for obtaining white light. Accordingly, the yellow phosphor particles are excited by the blue light from the blue LED chip and thus emit yellow light. As a result, white light is emitted from the wavelength converting member 53b due to the excited yellow light and the blue light from the blue LED chip. The lens 53c is made of a translucent material such as a resin, and formed to include the wavelength converting member 53b therein. The LED 2 in the light-emitting unit 53 is electrically connected to wiring that is formed on the substrate 53a through patterning. When the wiring is electrically connected to the light-emitting diode driver circuit 1, electric power is supplied to the LED 2 from the light-emitting diode driver circuit 1. It is to be noted that the light-emitting unit 53 is positioned in such a manner that the optical axis of the light-emitting unit 53 and the central axis of the cup-shaped heat sink 52 align.

The lighting apparatus 3 configured as above is attached to a socket of a lighting apparatus and the like and used. When turned ON, the LED 2 receives the electric power supply from the light-emitting diode driver circuit 1 to emit light. As a result, the light from the light-emitting unit 53 is emitted, as spot light, from the opening of the heat sink 52 through the front cover 56. Moreover, when the LED 2 is turned OFF, the electric power supply from the light-emitting diode driver circuit 1 completely stops and thus the LED 2 is completely turned OFF.

Although the light-emitting diode driver circuit and the LED light source according to the embodiments of the present invention are described as above, the present invention is not limited to these embodiments. For example, various modifications to the embodiments that are conceived by the person skilled in the art and other embodiments obtainable by combining the structural elements in the embodiments without materially departing from the scope of the present invention are included within the scope of the present invention.

INDUSTRIAL APPLICABILITY

The light-emitting diode driver circuit according to the present invention can be used in an apparatus, machine, or the like which utilizes LEDs. The LED light source according to the present invention that is the lighting apparatus using the LED is useful, specifically as an LED lighting apparatus including a small number of LEDs, for example, an LED lighting apparatus substituted for a halogen bulb.

REFERENCE SIGNS LIST 1, 1A Light-emitting diode driver circuit
2, 200 LED
3 Lighting apparatus
10 First rectifier circuit (DB1)
20, 20A Inverter (INV)
30 Inverter control circuit
31 Start trigger circuit (TRG)
32 Stop circuit (STP)
40 Second rectifier circuit (DB2)
50 Lighting apparatus
51 Case
51a Cylinder part
51b Protruding part
52 Heat sink
52a Bottom part
52b Side face part
53 Light-emitting unit
53a Substrate
53b Wavelength converting member
53c Lens
54 Shell
55 Eyelet
56 Front cover 57 Metal fitting
100 Light-emitting diode driver apparatus
110 Rectifier circuit
111, C1 Smoothing capacitor
112 Choke coil
113, D1, D2 Diode
114, C3, C4 Capacitor
120 Light-emitting diode driver semiconductor circuit
121 Switching device block
121a Junction FET
121b Switching device
122 Control circuit
122a Regulator
122b Oscillator
122c ON-time blanking pulse generator
123 Drain current detection circuit
124 Start/stop circuit
C5 Resonance capacitor
TD Trigger diode
ZD Zener diode
Q1 First switching device
Q2 Second switching device
Q3 Third switching device
Q4 Forth switching device
Q5 Fifth switching device
R1, R2, R3, R4, R5, R6, R7, R8 Resistor
L1, L2 Inductor
AC AC power source
CT Driving transformer
SW Switching circuit
P1, P2 Input terminal
P3, P4 Output terminal

The invention claimed is:

1. A light-emitting diode driver circuit for turning ON a light-emitting diode, the circuit comprising:
an electric power output unit configured to output electric power for driving the light-emitting diode; and
a control circuit which controls an operation of the electric power output unit,
wherein when a DC voltage applied to the control circuit has a value smaller than a predetermined value, the control circuit stops the operation of the electric power output unit,
wherein the control circuit includes:
a start trigger circuit which starts and maintains the operation of the electric power output unit; and
a stop circuit which stops an operation of the start trigger circuit,
the DC voltage is applied to the stop circuit, and
when the DC voltage applied to the stop circuit has a value smaller than the predetermined value, the stop circuit stops the operation of the start trigger circuit and the operation of the electric power output unit.

2. The light-emitting diode driver circuit according to claim 1,
wherein the electric power output unit includes
a switching device for converting electric power provided to the electric power output unit, the electric power being provided for driving the light-emitting diode.

3. The light-emitting diode driver circuit according to claim 2,
wherein the start trigger circuit
(a) includes:
a first resistor;
a capacitor connected to the first resistor in series; and
a trigger diode connected to a connection point between the first resistor and the capacitor, and
(b) starts the operation of the electric power output unit as a result of a predetermined voltage held in the capacitor causing the trigger diode to conduct electric power.

4. The light-emitting diode driver circuit according to claim 3,
wherein the stop circuit
(a) includes:
a second resistor; and
another switching device which is different from the switching device and is connected to the second resistor and connected in parallel to the capacitor in the start trigger circuit, and
(b) stops the operation of the start trigger circuit as a result of said another switching device being turned ON.

5. A light-emitting diode driver circuit for turning ON a light-emitting diode, the circuit comprising:
an inverter which outputs electric power for driving the light-emitting diode; and
an inverter control circuit which controls an operation of the inverter,
wherein when a DC voltage applied to the inverter control circuit has a value smaller than a predetermined value, the inverter control circuit stops the operation of the inverter,
the inverter includes:
a first switching device;
a second switching device connected to the first switching device in series; and
a driving transformer, and
the first switching device and the second switching device are alternately turned ON and OFF due to inducing oscillation generated by the driving transformer.

6. The light-emitting diode driver circuit according to claim 5,
wherein the first switching device and the second switching device are bipolar transistors.

7. An LED light source comprising:
the light-emitting diode driver circuit according to claim 1; and
a light-emitting diode which is turned ON by the light-emitting diode driver circuit.

* * * * *